May 26, 1970   J. H. ROFF   3,513,969
BUMPER JACK CONTAINER ASSEMBLY
Filed Nov. 4, 1968   2 Sheets-Sheet 1
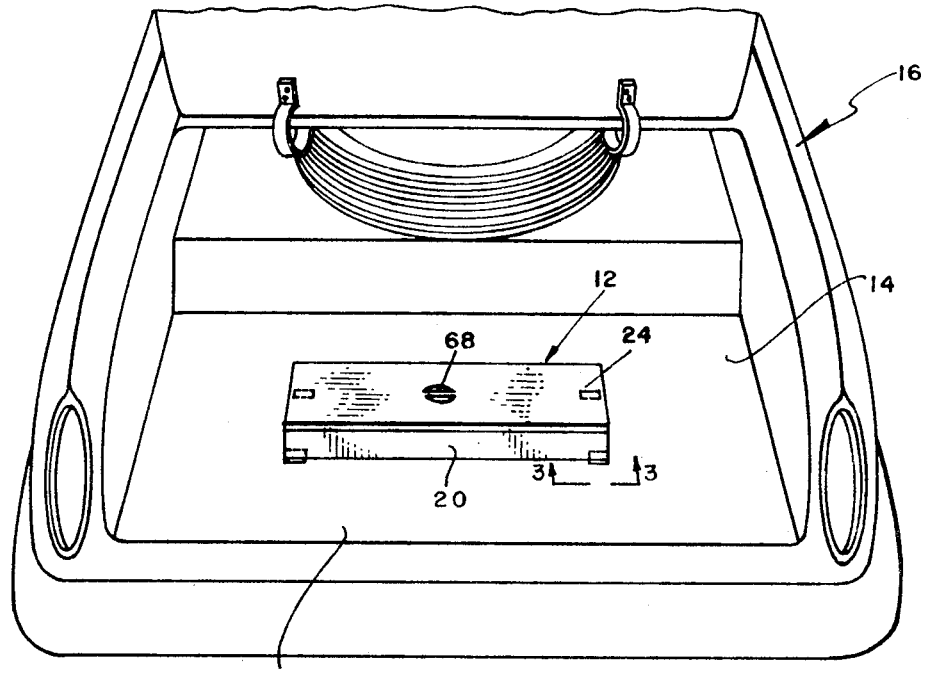
FIG. 1
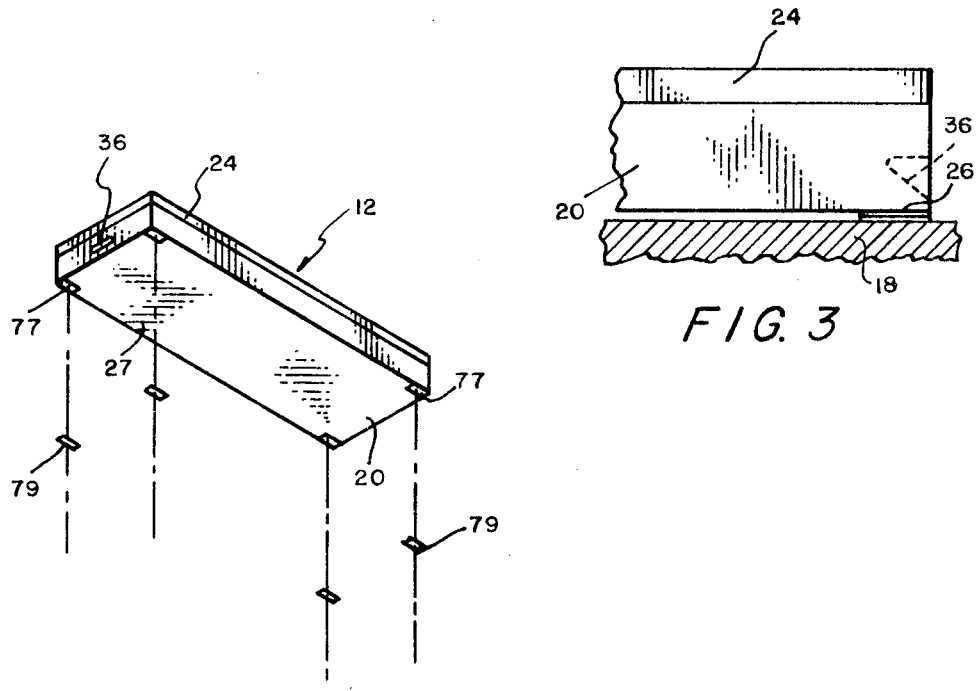
FIG. 2
FIG. 3
INVENTOR.
JACK H. ROFF
BY John H. Wilkinson
ATTORNEY May 26, 1970     J. H. ROFF     3,513,969
BUMPER JACK CONTAINER ASSEMBLY
Filed Nov. 4, 1968     2 Sheets-Sheet 2
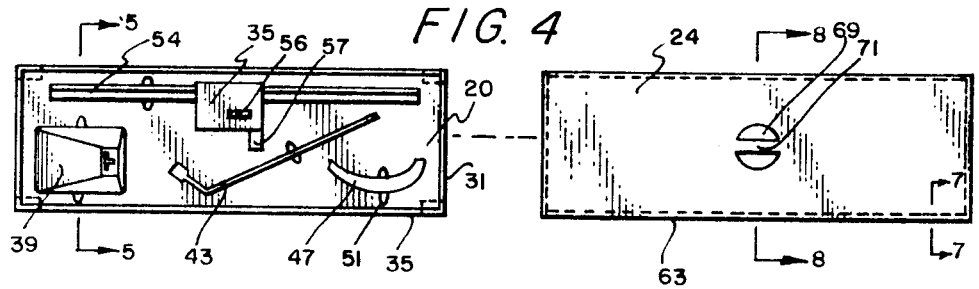
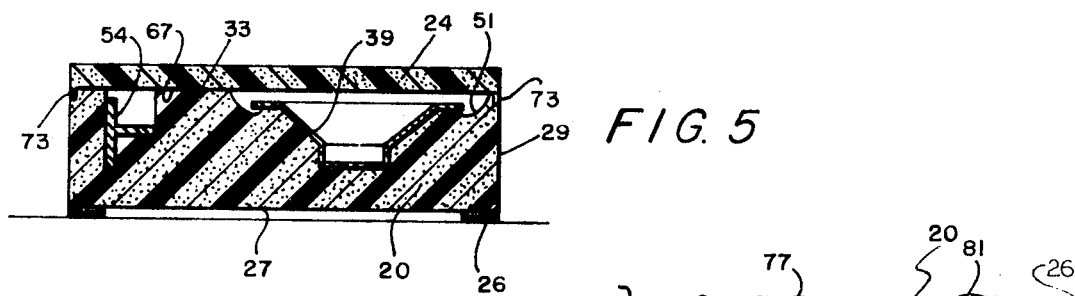
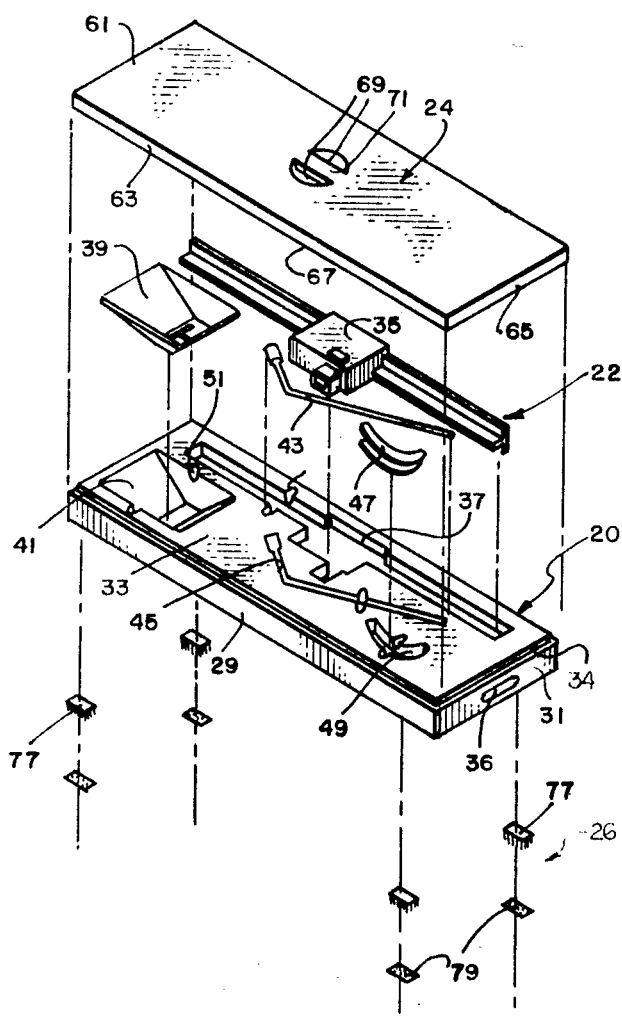
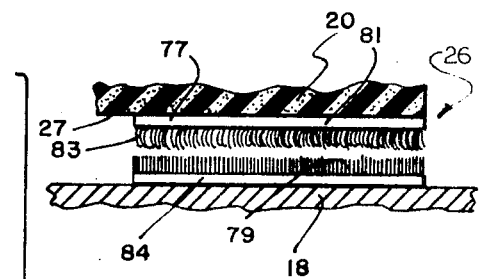
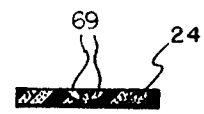
INVENTOR.
JACK H. ROFF
BY John H. Widdowson
ATTORNEY

United States Patent Office 3,513,969
Patented May 26, 1970

3,513,969
BUMPER JACK CONTAINER ASSEMBLY
Jack H. Roff, 3927 Meadowlane,
Wichita, Kans. 67218
Filed Nov. 4, 1968, Ser. No. 773,262
Int. Cl. A46c 11/24; B65d 85/54
U.S. Cl. 206—16   2 Claims

ABSTRACT OF THE DISCLOSURE

This invention is a bumper jack container case including a main support base assembly adapted to receive a bumper kit assembly therein; a lid member mountable on the support base assembly to completely enclose the bumper jack kit assembly; and attachment means operable to releasably secure the support base assembly to a given support surface. More particularly, this invention is a bumper jack container case constructed of a foam material having indentations adapted to compactly receive the various elements of a bumper jack kit assembly therein in an enclosed manner whereas to prevent noisy contact and presents the same in a compact, neat appearing structure.

---

Numerous types of container assemblies are known to the prior art operable to receive and hold various portable power tools such as saws, drills, or bowling shoes and the like. However, the prior art devices are not operable to receive numerous elements such as found in a bumper jack kit assembly in a compact manner and operable so as to be readily and releasably attachable to a support surface such as found in a vehicle trunk.

In one preferred embodiment of this invention, a bumper jack container assembly includes a base support assembly connectible as by an attachment means to a support surface; a bumper jack kit assembly mounted within respective indentations in the support base assembly; and a lid member adapted to be mounted upon the support base assembly to completely and compactly enclose the bumper jack kit assembly. The support base assembly is of a generally rectangular block shape having a bottom wall; integral sidewalls and end walls; and a top wall off set as by a stepped portion relative to the adjacent sidewalls and end walls. The end walls are provided with lift groove portions to be readily grasped by a person for raising the base support assembly. The top wall is provided with a plurality of irregularly shaped indentations adapted to receive in a compact and supporting manner the various elements of the bumper jack kit assembly. The bumper jack kit assembly includes an operator jack assembly, a base plate adapted to support the jack assembly, an actuator handle and wrench adapted to remove lug nuts and also actuate the operator jack assembly, and a bumper connector operably attachable to the jack assembly and to a portion of a vehicle for lifting the same in a conventional manner. Each of the irregular indentations is provided with a finger groove extended laterally therefrom operable to receive a person's finger therein for easily removing the various elements of the bumper jack kit assembly. The lid member is of a generally rectangular plate shape having a top wall with integral sidewalls and end walls and a bottom wall. The bottom wall is provided with a downwardly or laterally extended flange to be received within the stepped portion of the top wall of the support base assembly for securing the same against lateral movement. The top wall of the lid member is provided with adjacent finger grip grooves adapted to receive one's fingers therein about a bar section for lifting the same as required. It is to be noted that the lid member and the support assembly is preferably constructed of a foam material such as styrofoam so that the same can be easily formed and of economical and light weight construction. The attachment means includes basic looped pile strips attached in a spaced relationship to a support surface as by an adhesive or the like and hooked pile fabric strips which are also secured in a predetermined manner adjacent the corners of the bottom wall of the support base assembly as by adhesive or the like. This combination of looped pile strips and the hooked pile fabric strips are operable to be readily grasped to each other on contact of their surfaces to provide substantial rigidity against lateral movement and somewhat against vertical movement.

One object of this invention is to provide a bumper jack kit container assembly overcoming the aforementioned disadvantages of the prior art devices.

Another object of this invention is to provide a bumper jack container assembly having a support base assembly to receive various elements of a bumper jack kit assembly within respective indentations and having a lid member readily mounted upon the support base assembly to completely enclose the bumper jack kit assembly.

Still, one other object of this invention is to provide a bumper jack container assembly to receive a bumper jack kit assembly within a foam constructed base and lid member and having an attachment means to readily and releasably secure the same to a given support surface.

Still, one further object of this invention is to provide a container assembly which is economical to manufacture, lightweight and durable in construction, readily manufactured to provide various indentations to receive portions of a tool kit assembly, and simple to use when required to attach and remove from a given support surface.

Various other objects, advantages, and features of the invention will become apparent to those skilled in the art from the following discussion, taken in conjunction with the accompanying drawings, in which:

FIG. 1 is a perspective view of a bumper jack container assembly of this invention illustrating the same as attached to a support surface of a trunk of an automobile;

FIG. 2 is a perspective view of the bumper jack assembly of this invention illustrating a portion of the attachment means exploded outwardly;

FIG. 3 is an enlarged fragmentary sectional view taken along line 3—3 in FIG. 1;

FIG. 4 is a top plan view of the bumper jack container assembly of this invention illustrating a lid member removed therefrom;

FIG. 5 is an enlarged sectional view taken along lines 5—5 in FIG. 4;

FIG. 6 is an exploded perspective view of the bumper jack container assembly of this invention;

FIG. 7 is an enlarged sectional view taken along line 7—7 in FIG. 4; and

FIG. 8 is a sectional view taken along line 8—8 in FIG. 4.

The following is a discussion and description of preferred specific embodiments of the new bumper jack container assembly of this invention, such being made with reference to the drawings, whereupon the same reference numerals are used to indicate the same or similar parts and/or structure. It is to be understood that such discussion and description is not to unduly limit the scope of the invention.

Referring to the drawings in detail in particular to FIG. 1, the bumper jack container assembly, indicated generally at 12, is illustrated as attached to and mounted within a trunk area 14 of an automotive vehicle 16. More particularly, the bumper jack container assembly 12 is releasably secured to a trunk support surface 18 so as to present a neat appearing and compact structure therein. However, it is obvious that the bumper jack container assembly 12 can be readily secured to any desired support surface or in any position within the vehicle trunk area 14.

As shown in FIG. 6, the bumper jack container assembly 12 includes a main support base assembly 20 to receive therein a bumper jack kit assembly 22; a lid member 24 mountable upon the support base assembly 20 to enclose the bumper jack kit assembly 22; and an attachment means 26 operable to readily secure the support base assembly 20 to the support surface 18.

The support base assembly 20 is of a generally rectangular block shape having a bottom wall 27 with integral sidewalls 29 and end walls 31, and an upper top wall 33 off set as by a peripheral, downwardly stepped portion 34 from the adjacent sidewalls 29 and end walls 31. Each of the end walls 31 is provided with a cut out, concave, lift groove 36 positioned directly opposite each other in the end walls 31 and operable to receive one's fingers therein for lifting the bumper jack container assembly 12 as required. The top wall 33 is provided with a plurality of spaced indentations or cut-out areas adapted to receive the various elements of the bumper jack kit assembly 22 therein.

As shown in FIGS. 4 and 6, the bumper jack kit assembly 22 includes an operator jack assembly 35 mountable within an operator jack indentation 37; a base plate member 39 mountable within a base plate indentation 41; an actuator handle and wrench 43 mountable within an actuator and wrench indentation 45; and a bumper connector 47 also mountable within a bumper connector indentation 49. Each of the various aforementioned indentations are adapted to receive the respective elements of the bumper jack kit assembly 22 in a compact snug manner adapted to support each element along its length and restrict lateral movement to prevent contact with an adjacent element. Additionally, each of the aforementioned indentations are provided with a generally arcuate or dome-shaped opposed pairs of finger grip indentations 51 with a depth so that each one of such indentations are below the various element to which it is placed. The finger grip indentations 51 are readily operable to permit grasping the various ones of the elements of the bumper jack kit assembly 22 as these elements are all placed below the upper surface of the top wall 33 of the support base assembly 20.

The operator jack assembly 35 includes a support post 54 mounted within an actuator mechanism 56 for axial movement therealong and having a ratchet member 57 for actuation of the same in a substantially conventional manner. The base plate member 39 is to receive and support the operator jack assembly 35 therein against the support surface adjacent a bumper of a vehicle for lifting the same. The bumper connector 47 is to be connected to the actuator mechanism 56 in a substantially conventional manner and additionally connected to a vehicle bumper for the raising or lowering the same on axial movement of the actuator mechanism 56. The actuator handle and wrench 43 is operable to remove the lug nuts on a vehicle wheel and also adapted to be connected to the actuator mechanism 56 for raising and lowering the same in a conventional manner upon the support post 54 which is required on removing and replacing vehicle tires. It is obvious that the various aforementioned indentations for the elements of the bumper jack kit assembly 22 can be altered somewhat in size and shape as required so that each of other such elements fit within the respective indentations in a snug, compact manner.

The lid member 24 is of a generally rectangular plate shape having a top wall 61, integral sidewalls 63, end walls 65, and a bottom wall 67. The top wall 61 is formed with centrally positioned chordal cut-out portions 69 of arcuate shape having a grasping section 71 therebetween. This is readily operable in a conventional manner for gripping the grasping section 71 by one's fingers for releasing and lifting the lid member 24 from the support base assembly 20. Also, the bottom wall 67 is formed about its periphery with a downwardly extended flange 73 to be received in a snug compact manner with the stepped portion 34 of the top wall 33 of the support base assembly 20. This operates to place the lid member 24 on the support base assembly 20 in a guiding and compact manner and prevents lateral movement therefrom.

The attachment means 26 includes a plurality, namely four, hooked pile fabric strips 77 attached to the respective corner of the bottom wall 27 of the support base assembly 20 and cooperating looped pile strips 79 to be attached to the support surface 18 on which the bumper jack container asembly 12 is to be supported. The hooked pile fabric strips 77 are provided with one support side 81 and the opposite side is provided with a plurality of projecting adjacent, stiff, barbed splines 83. The splines 83 are each formed as elongated barbs provided with curved hooks which are stiff but movable from a generally closed to an open condition on pulling of the same. The support sides 81 may be attached to the respective corners of the bottom wall 27 as by an adhesive material or the like. The looped pile strips 79 are additionally provided with a bottom support surface 84 to be secured to the support surface of the vehicle trunk area 14 as by adhesive and are spaced so as to be an overlying, cooperating relationship of each of the spaced hooked pile fabric strips 77. The looped pile strips 79 are constructed of a plurality of loops to receive and cooperate with the splines 83 on the hooked pile fabric strips 77. This material is well known in the art and such a fastener is a type known as a "Velcro" fastener and the splines disclosed herein can be manufactured as disclosed in U.S. Pat. No. 2,717,437. Additionally, this type of hooked pile fabric strips employed may be available on the market as shown in U.S. Pat. No. 2,820,277.

In the use and operation of the bumper jack container assembly 12 of this invention, it is seen that the support base assembly 20 may be readily attached to the support surface 18 through the use of the attachment means 26 whereupon the looped pile fabric strips 79 are secured to the supporting surface 18 so as to be attractive in appearance and not to grasp onto any other material when the bumper jack container assembly 12 is removed therefrom. It is obvious that the same can be secured to any desired position upon any support surface as required. The attachment means 26 provides a very efficient and effective means of readily securing the support base assembly 20 in a given position as the interlocking portions of the hooked pile fabric strips 77 and the looped pile strips 79 are very effective on preventing relative, lateral movement.

It is seen that the elements of the bumper jack kit assembly 22 are readily mountable within their various indentations in the top wall 33 of the support base assembly 20 in a most compact and efficient manner whereupon the foam material construction prevents lateral and downward movement thereof. The lid member 24 is readily placed in cooperating engagement with the top wall 33 and stepped portion 34 of the support base assembly 20 to provide a neat appearing compact structure. It is obvious that the entire bumper jack container assembly 12 may be readily removed from the vehicle trunk 14 to be placed adjacent the tire being worked upon whereupon all tools are maintained in easy reach in a compact manner.

It will be apparent from the foregoing description of the applicant's bumper jack container assembly, relatively inexpensive means have been provided to maintain various elements of a bumper jack kit assembly in one compact location and maintain the same so as to not have any noise normally found in conventional means of attaching such jack kit assemblies in the trunk area of a vehicle. Additionally, this assures easy access of one to the bumper jack kit assembly whereas in conventional structures, the spare tire and other items have to be removed before access can be had to the bumper jack kit assembly. The attachment of the bumper jack kit assembly through the use of the "Velcro" connecting strips provides efficient and effective means for holding the same in a desired location but providing means for releasing the same when needed for usage. Additionally, the bumper jack container assembly is constructed of a lightweight styrofoam material which is noted for its durable characteristics plus providing insulation against movement and resultant noise.

While the invention has been described in conjunction with preferred specific embodiments thereof, it will be understood that this description is intended to illustrate and not to limit the scope of the invention, which is defined by the following claims.

I claim:
1. A container assembly, including:
   (a) a support base assembly,
   (b) a tool kit assembly having a plurality of elements received within respective indentations in said support base assembly in a compact manner held against downward and lateral movement,
   (c) attachment means having cooperating members attached to said support base assembly and a given support surface whereby said support base assembly is held against lateral movement and is releasably connected thereto for immediate release from the support surface on opposite parallel movement of said cooperating members,
   (d) said support base assembly including a bottom wall having integral sidewalls and end walls, and a top wall having said indentations therein,
   (e) said tool kit assembly having a plurality of elements operable to change a tire on a vehicle including an operator jack assembly, a base plate member, an actuator handle and wrench member, and a bumper connector, each received in respective ones of said indentations giving peripheral support thereto and having the upper surface of each of said elements below the top surface of said top wall, and
   (f) a lid member having a top wall, a bottom wall, and a downwardly peripheral flange on said bottom wall, and placed in cooperating engagement with said support base assembly to enclose said indentations with said flange and prevent lateral movement of said lid member relative to said support base assembly.

2. A container assembly as described in claim 1, wherein:
   (a) said attachment means having hooked connector strips attached to a bottom wall of said support base assembly as by an adhesive and having downwardly depending open hook members, and
   (b) said attachment means having looped support strips attached to the said support surface as by an adhesive and having upwardly extending looped pile members to be readily grasped by said hooked connector strips, base strips to hold the same against vertical and lateral movement requiring considerable upward lifting pressure against said support base assembly to release said cooperating members.

References Cited
UNITED STATES PATENTS
2,649,191   8/1953   McLaughlin _____ 206—16
3,243,037   3/1966   Luertzing _____ 206—16

JAMES B. MARBERT, Primary Examiner